US009405488B1

(12) United States Patent
Foley et al.

(10) Patent No.: US 9,405,488 B1
(45) Date of Patent: Aug. 2, 2016

(54) SYSTEM AND METHOD FOR STORAGE MANAGEMENT

(71) Applicant: EMC Corporation, Hopkinton, MA (US)

(72) Inventors: Robert P. Foley, Clinton, MA (US); Peter Puhov, Shrewsbury, MA (US); Naizhong Chiu, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 169 days.

(21) Appl. No.: 13/923,854

(22) Filed: Jun. 21, 2013

(51) Int. Cl.
*G06F 3/06* (2006.01)
*G06F 11/16* (2006.01)
*G06F 11/20* (2006.01)

(52) U.S. Cl.
CPC .......... *G06F 3/0689* (2013.01); *G06F 11/1658* (2013.01); *G06F 11/2089* (2013.01); *G06F 11/2092* (2013.01)

(58) Field of Classification Search
None
See application file for complete search history.

(56) References Cited

U.S. PATENT DOCUMENTS 5,790,775 A * 8/1998 Marks et al. ............. 714/5.11
6,460,149 B1 * 10/2002 Rowlands et al. ............ 714/43
8,244,998 B1 * 8/2012 Krinke, II .................. 711/162
2005/0086405 A1 * 4/2005 Kobayashi et al. .......... 710/260
2008/0115008 A1 * 5/2008 Daftardar ..................... 714/3
2010/0162036 A1 * 6/2010 Linden et al. ................ 714/4
2011/0010560 A1 * 1/2011 Etchegoyen ................ 713/189

* cited by examiner

Primary Examiner — Jared Rutz
Assistant Examiner — William E Baughman
(74) Attorney, Agent, or Firm — Brian J. Colandreo, Esq.; Mark H. Whittenberger, Esq.; Holland & Knight LLP

(57) ABSTRACT

A method, computer program product, and computing system for receiving, on an active storage processor from a passive storage processor, a join request indicator. The join request indicator indicates that the passive storage processor wants to transition to an active status. The active storage processor and the passive storage processor are both coupled to a data array. A status change indicator is provided from the active storage processor to the passive storage processor, wherein the status change indicator indicates that the passive-to-active transition of the passive storage processor has been initiated. A first data array status indicator is received on the active storage processor from the passive storage processor, wherein the first data array status indicator indicates the status of the data array as seen by the passive storage processor. A second data array status indicator is generated on the active storage processor, wherein the second data array status indicator indicates the status of the data array as seen by the active storage processor.

12 Claims, 4 Drawing Sheets

SYSTEM AND METHOD FOR STORAGE MANAGEMENT

TECHNICAL FIELD

This disclosure relates to storage systems and, more particularly, to systems and methods for managing storage systems.

BACKGROUND

Storing and safeguarding electronic content is of paramount importance in modern business. Accordingly, various systems may be employed to protect such electronic content.

The use of high-availability data arrays is increasing in popularity, wherein each data array may be configured to serve a plurality of hosts (e.g., storage processors). These hosts may be configured in an active or a passive fashion, wherein a passive host may be on standby mode and ready to be called into duty in the event that the active host fails.

SUMMARY OF DISCLOSURE

In one implementation, a computer-implemented method includes receiving, on an active storage processor from a passive storage processor, a join request indicator. The join request indicator indicates that the passive storage processor wants to transition to an active status. The active storage processor and the passive storage processor are both coupled to a data array. A status change indicator is provided from the active storage processor to the passive storage processor, wherein the status change indicator indicates that the passive-to-active transition of the passive storage processor has been initiated. A first data array status indicator is received on the active storage processor from the passive storage processor, wherein the first data array status indicator indicates the status of the data array as seen by the passive storage processor. A second data array status indicator is generated on the active storage processor, wherein the second data array status indicator indicates the status of the data array as seen by the active storage processor.

One or more of the following features may be included. The first data array status indicator may be compared to the second data array status indicator to determine if the active storage processor and the passive storage processor are seeing the same status for the data array. If the active storage processor and the passive storage processor are seeing the same status for the data array: a first syncing indicator may be provided from the active storage processor to the passive storage processor, wherein the first syncing indicator indicates that the active storage processor is ready to begin synchronization; and a second syncing indicator is received on the active storage processor from the passive storage processor, wherein the second syncing indicator indicates that the passive storage processor is ready to begin synchronization.

In response to receiving the second synching indicator: all out-of-band activities being performed on the active storage processor may be stopped; a first joined indicator may be provided from the active storage processor to the passive storage processor, wherein the first joined indicator indicates that the active storage processor is ready for the passive storage processor to transition to an active state; and a second joined indicator may be received on the active storage processor from the passive storage processor, wherein the second joined indicator indicates that the passive storage processor has transitioned to an active state.

If the active storage processor and the passive storage processor are not seeing the same status for the data array, the status of the data array may be normalized so that the active storage processor and the passive storage processor see the same status for the data array. Normalizing the status of the data array may include preventing one of the active and the passive storage processors from seeing one or more drives included within the data array. Normalizing the status of the data array may include redirecting IO commands between the active and the passive storage processors.

In another implementation, a computer program product resides on a computer readable medium and has a plurality of instructions stored on it. When executed by a processor, the instructions cause the processor to perform operations including receiving, on an active storage processor from a passive storage processor, a join request indicator. The join request indicator indicates that the passive storage processor wants to transition to an active status. The active storage processor and the passive storage processor are both coupled to a data array. A status change indicator is provided from the active storage processor to the passive storage processor, wherein the status change indicator indicates that the passive-to-active transition of the passive storage processor has been initiated. A first data array status indicator is received on the active storage processor from the passive storage processor, wherein the first data array status indicator indicates the status of the data array as seen by the passive storage processor. A second data array status indicator is generated on the active storage processor, wherein the second data array status indicator indicates the status of the data array as seen by the active storage processor.

One or more of the following features may be included. The first data array status indicator may be compared to the second data array status indicator to determine if the active storage processor and the passive storage processor are seeing the same status for the data array. If the active storage processor and the passive storage processor are seeing the same status for the data array: a first syncing indicator may be provided from the active storage processor to the passive storage processor, wherein the first syncing indicator indicates that the active storage processor is ready to begin synchronization; and a second syncing indicator is received on the active storage processor from the passive storage processor, wherein the second syncing indicator indicates that the passive storage processor is ready to begin synchronization.

In response to receiving the second synching indicator: all out-of-band activities being performed on the active storage processor may be stopped; a first joined indicator may be provided from the active storage processor to the passive storage processor, wherein the first joined indicator indicates that the active storage processor is ready for the passive storage processor to transition to an active state; and a second joined indicator may be received on the active storage processor from the passive storage processor, wherein the second joined indicator indicates that the passive storage processor has transitioned to an active state.

If the active storage processor and the passive storage processor are not seeing the same status for the data array, the status of the data array may be normalized so that the active storage processor and the passive storage processor see the same status for the data array. Normalizing the status of the data array may include preventing one of the active and the passive storage processors from seeing one or more drives included within the data array. Normalizing the status of the data array may include redirecting IO commands between the active and the passive storage processors.

In another implementation, a computing system including a processor and memory is configured to perform operations including receiving, on an active storage processor from a passive storage processor, a join request indicator. The join request indicator indicates that the passive storage processor wants to transition to an active status. The active storage processor and the passive storage processor are both coupled to a data array. A status change indicator is provided from the active storage processor to the passive storage processor, wherein the status change indicator indicates that the passive-to-active transition of the passive storage processor has been initiated. A first data array status indicator is received on the active storage processor from the passive storage processor, wherein the first data array status indicator indicates the status of the data array as seen by the passive storage processor. A second data array status indicator is generated on the active storage processor, wherein the second data array status indicator indicates the status of the data array as seen by the active storage processor.

One or more of the following features may be included. The first data array status indicator may be compared to the second data array status indicator to determine if the active storage processor and the passive storage processor are seeing the same status for the data array. If the active storage processor and the passive storage processor are seeing the same status for the data array: a first syncing indicator may be provided from the active storage processor to the passive storage processor, wherein the first syncing indicator indicates that the active storage processor is ready to begin synchronization; and a second synching indicator is received on the active storage processor from the passive storage processor, wherein the second syncing indicator indicates that the passive storage processor is ready to begin synchronization.

In response to receiving the second synching indicator: all out-of-band activities being performed on the active storage processor may be stopped; a first joined indicator may be provided from the active storage processor to the passive storage processor, wherein the first joined indicator indicates that the active storage processor is ready for the passive storage processor to transition to an active state; and a second joined indicator may be received on the active storage processor from the passive storage processor, wherein the second joined indicator indicates that the passive storage processor has transitioned to an active state.

If the active storage processor and the passive storage processor are not seeing the same status for the data array, the status of the data array may be normalized so that the active storage processor and the passive storage processor see the same status for the data array. Normalizing the status of the data array may include preventing one of the active and the passive storage processors from seeing one or more drives included within the data array. Normalizing the status of the data array may include redirecting IO commands between the active and the passive storage processors.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
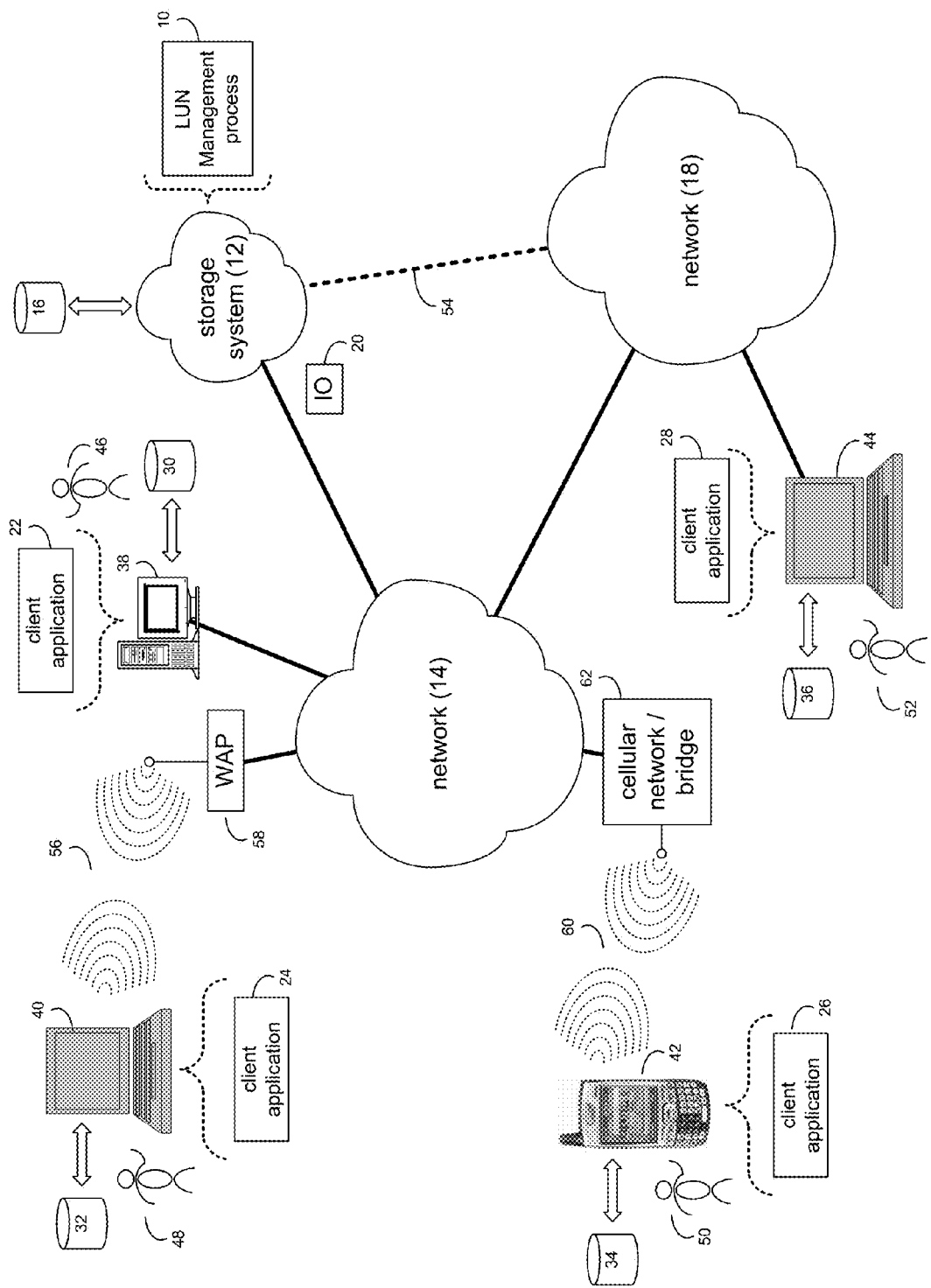
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
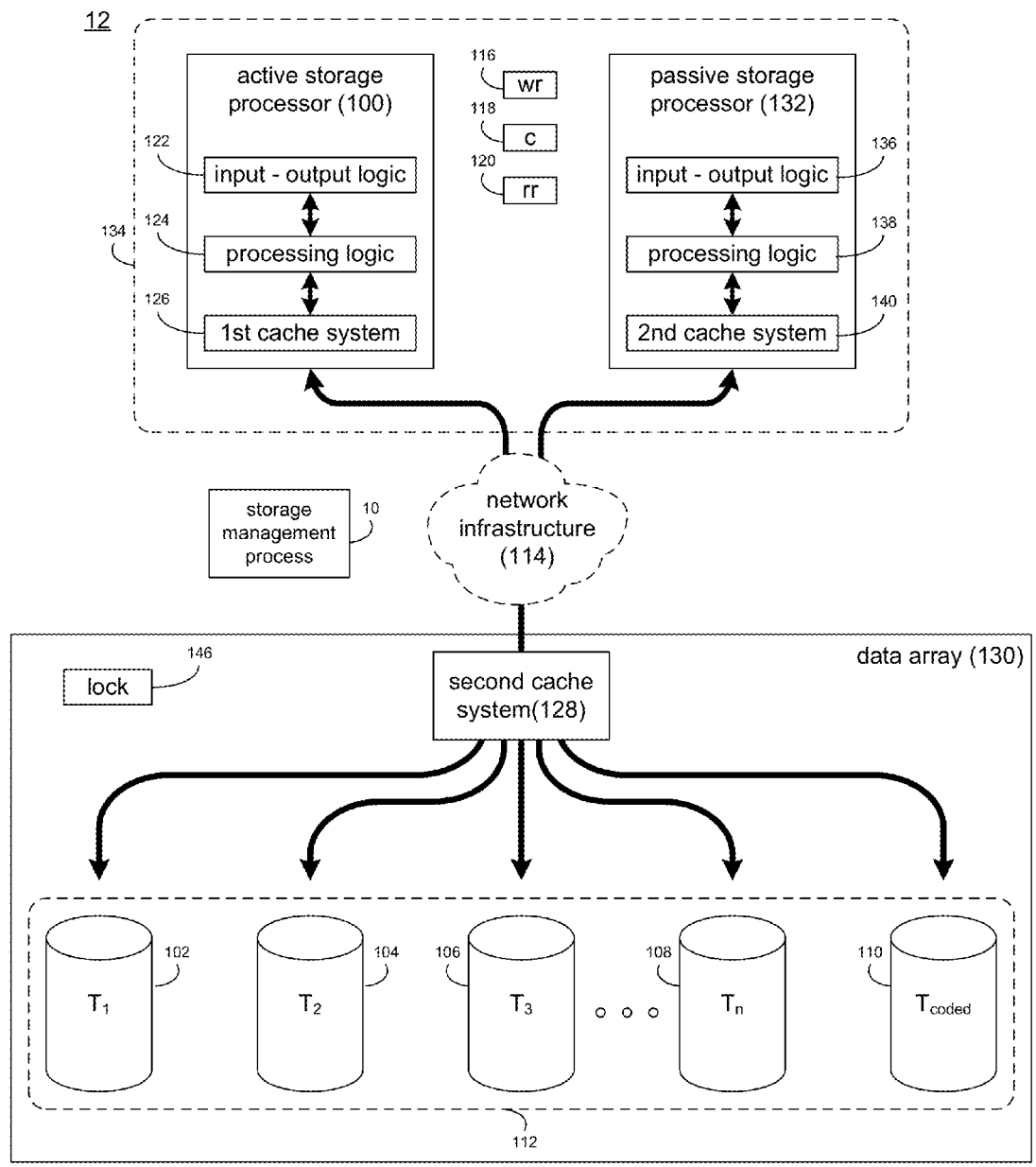
FIG. 2 is a diagrammatic view of the storage system of FIG. 1.

Referring also to FIG. 2, storage system 12 may include active storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which active storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which active storage processor 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. active storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to active storage processor 100, may be executed by one or more processors (not shown) and one or more memory architectures (not shown) included within active storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when active storage processor 100 is configured as an application server, these IO requests may be internally generated within active storage processor 100. Examples of IO request 20 may include but are not limited to data write request 116 (i.e. a request that content 118 be written to storage system 12) and data read request 120 (i.e. a request that content 118 be read from storage system 12).

Active storage processor 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of active storage processor 100, content 118 to be written to storage system 12 may be received by input-output logic 122 (e.g. from network 14 and/or network 18) and processed by processing logic 124. Additionally/alternatively and when active storage processor 100 is configured as an application server, content 118 to be written to storage system 12 may be internally generated by active storage processor 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on active storage processor 100, some or all of the instruction sets and subroutines of storage management process 10 may be executed by one or more processors (not shown) and one or more memory architectures (not shown) included within data array 130.

The Storage Management Process:

Assume for the following example that passive storage processor 132 is currently configured to be passive (with respect to active storage processor 100) within cluster 134, wherein both active storage processor 100 and passive storage processor 132 are coupled to data array 130. Accordingly, passive storage processor 132 may currently be configured to be in standby mode and ready to be activated in the event that e.g., active storage processor 100 fails.

For the following discussion, active storage processor 100 and passive storage processor 132 are going to be described as being coupled to a single data array (namely data array 130). This, however, is for illustrative purposes only and is not intended to be a limitation of this disclosure, as other configurations are possible and are considered to be within the scope of this disclosure. For example, active storage processor 100 and passive storage processor 132 may be coupled to one or more additional data arrays (not shown). Accordingly, storage management process 10 may be executed for each individual data array to which active storage processor 100 and passive storage processor 132 are coupled.

Passive storage processor 132 may include input-output logic 136 (e.g., a network interface card or a Host Bus Adaptor (HBA)), processing logic 138, and second cache system 140. Examples of second cache system 140 may include but are not limited to a volatile, solid-state, cache memory system (e.g., a dynamic RAM cache memory system) and/or a non-volatile, solid-state, cache memory system (e.g., a flash-based, cache memory system). The instruction sets and subroutines of storage management process 10 may also be executed by one or more processors (not shown) and one or more memory architectures (not shown) included within passive storage processor 132.

Figure 3:
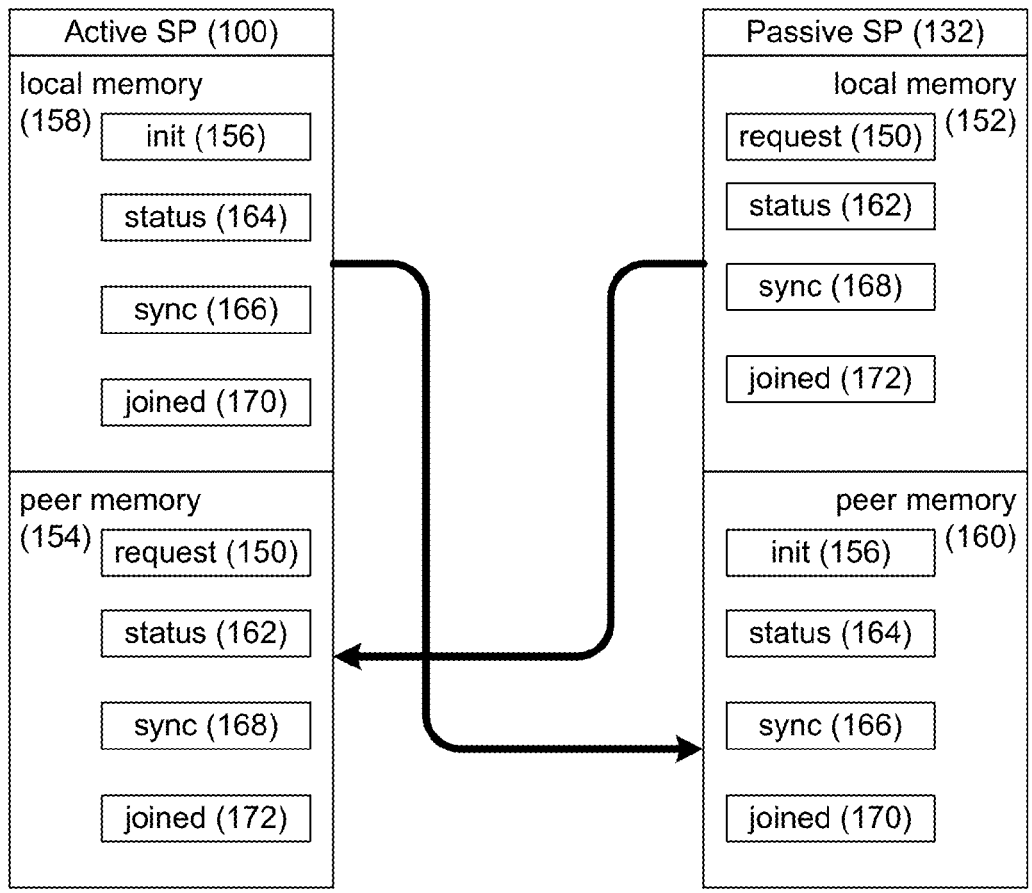
FIG. 3 is another diagrammatic view of the storage system of FIG. 1.
Figure 4:
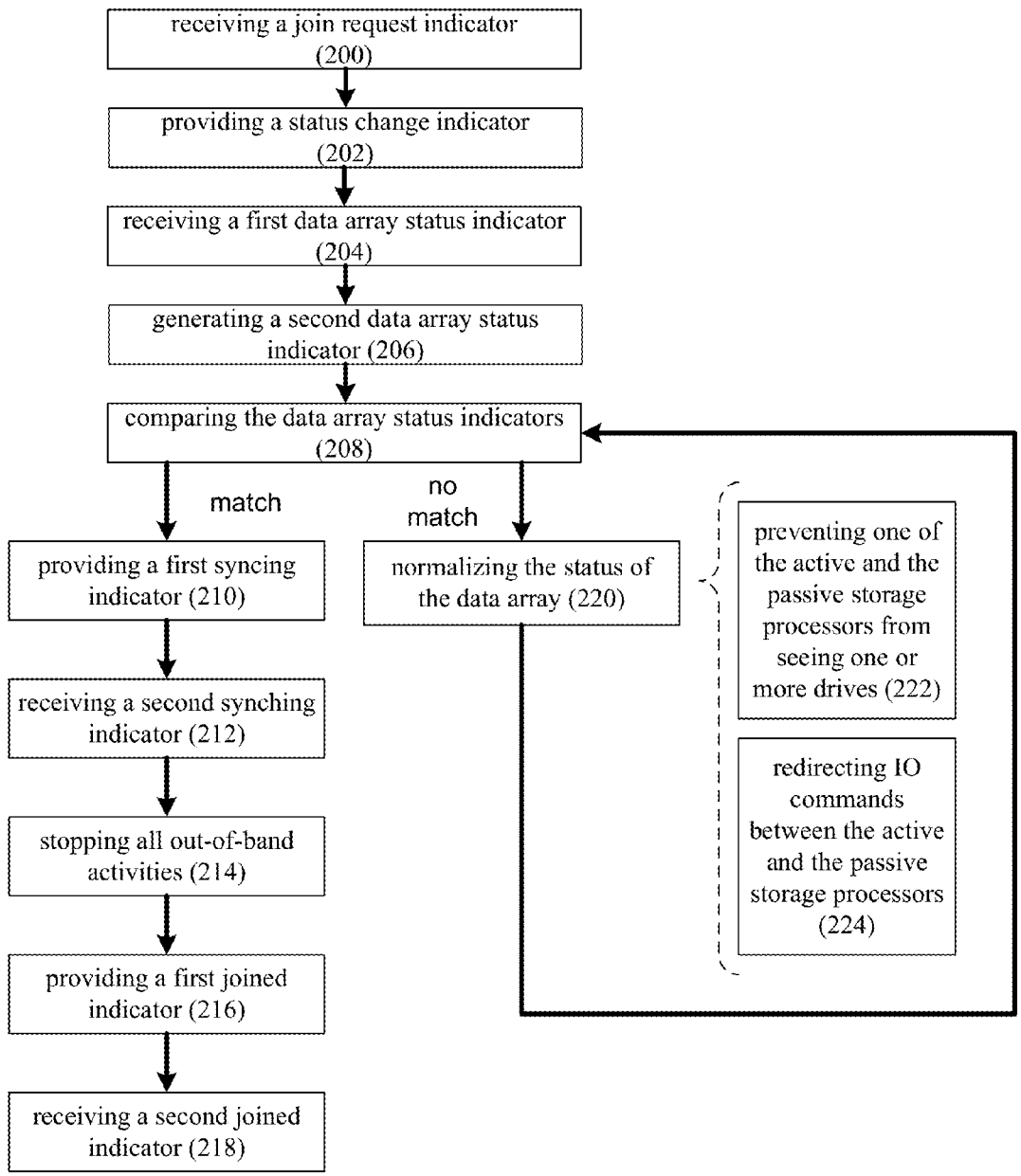
FIG. 4 is a flow chart of one implementation of the storage management process of FIG. 1.

Referring also to FIGS. 3-4, assume that it is desired for passive storage processor 132 to assume an active role within cluster 134 so that it may e.g., begin to process IO requests (e.g., data write request 116 and/or data read request 120).

Accordingly, passive storage processor 132 may generate join request indicator 150, which may be written to local memory 152 of passive storage processor 132. Local memory 152 of passive storage processor 132 may be configured so that its contents are automatically copied/mirrored to peer memory 154 of active storage processor 100. Accordingly, join request indicator 150 may be automatically copied/mirrored to peer memory 154 of active storage processor 100. Join request indicator 150 may indicate that passive storage processor 132 wishes to transition to an active status e.g., within cluster 134.

Upon active storage processor 100 receiving 200 join request indicator 150 from passive storage processor 132, storage management process 10 may provide 202 status change indicator 156 from active storage processor 100 to passive storage processor 132.

Specifically, active storage processor 100 may write status change indicator 156 to local memory 158 of active storage processor 100. Local memory 158 of active storage processor 100 may be configured so that its contents are automatically copied/mirrored to peer memory 160 of passive storage processor 132. Accordingly, status change indicator 156 may be automatically copied/mirrored to peer memory 160 of passive storage processor 132. Status change indicator 156 may indicate that the passive-to-active transition of passive storage processor 132 has been initiated.

Upon passive storage processor 132 receiving status change indicator 156 within peer memory 160, passive storage processor 132 may generate first data array status indicator 162 for e.g., data array 130. For example and for illustrative purposes only, assume that both of storage processors 100, 132 are configured to use targets 102, 104, 106, 108, 110 within data array 130. Accordingly, upon receiving status change indicator 156 within peer memory 160, passive storage processor 132 may examine data array 130 to determine the status of each of targets 102, 104, 106, 108, 110. For this example, assume that passive storage processor 132 is capable of accessing each of targets 102, 104, 106, 108, 110 and, therefore, all targets appear to be fully operational. Accordingly, passive storage processor 132 may generate first data array status indicator 162 (indicating that each of targets 102, 104, 106, 108, 110 is operational), which may be written to local memory 152 of passive storage processor 132. As discussed above, local memory 152 of passive storage processor 132 may be configured so that its contents are automatically copied/mirrored to peer memory 154 of active storage processor 100. Accordingly, first data array status indicator 162 may be automatically copied/mirrored to peer memory 154 of active storage processor 100.

Storage management process 10 may receive 204, on active storage processor 100 from passive storage processor 132, first data array status indicator 162, wherein first data array status indicator 162 may indicate the status of data array 130 as seen by passive storage processor 132.

Upon receiving 204 first data array status indicator 162, storage management process 10 may generate 206, on active storage processor 100, second data array status indicator 164. Accordingly, active storage processor 100 may examine data array 130 to determine the status of each of targets 102, 104, 106, 108, 110. For this example, assume that active storage processor 100 is capable of accessing each of targets 102, 104, 106, 108, 110 and, therefore, all targets appear to be fully operational. Accordingly, storage management process 10 may generate 206 second data array status indicator 164 (indicating that each of targets 102, 104, 106, 108, 110 is operational), which may be written to local memory 158 of active storage processor 100. Second data array status indicator 164 may indicate the status of data array 130 as seen by active storage processor 100.

Storage management process 10 may compare 208 first data array status indicator 162 to second data array status indicator 164 to determine if active storage processor 100 and passive storage processor 132 are seeing the same status for data array 130.

If active storage processor 100 and passive storage processor 132 are seeing the same status for data array 130 (i.e., first data array status indicator 162 and second data array status indicator 164 match), storage management process 10 may provide 210, from active storage processor 100 to passive storage processor 132 first syncing indicator 166, which may indicate that active storage processor 100 is ready to begin synchronization. Specifically, storage management process 10 may write first syncing indicator 166 to local memory 158 of active storage processor 100. Since (as discussed above) local memory 158 of active storage processor 100 is configured so that its contents are automatically copied/mirrored to peer memory 160 of passive storage processor 132, first syncing indicator 166 may be automatically copied/mirrored to peer memory 160 of passive storage processor 132.

Upon receiving first syncing indicator 166 from active storage processor 100, passive storage processor 132 may generate second synching indicator 168, which may indicate that passive storage processor 132 is also ready to begin synchronization. Specifically, passive storage processor 132 may write second syncing indicator 168 to local memory 152 of passive storage processor 132. Since (as discussed above) local memory 152 of passive storage processor 132 is configured so that its contents are automatically copied/mirrored to peer memory 154 of active storage processor 100, second syncing indicator 168 may be automatically copied/mirrored to peer memory 154 of active storage processor 100.

Storage management process 10 may receive 212 on active storage processor 100 second synching indicator 168 from passive storage processor 132. In response to receiving 212 second synching indicator 168, storage management process 10 may stop 214 all out-of-band activities being performed on active storage processor 100. Example of out-of-band activities may include activities that impact the status of data array 130, example of which may include but are not limited to: adding a target/drive, removing a target/drive, performing a rebuild operation, and performing a verify operation.

Once all out-of-band operations are stopped 214, storage management process 10 may provide 216 first joined indicator 170 from active storage processor 100 to passive storage processor 132, wherein first joined indicator 170 may indicate that active storage processor 100 is ready for passive storage processor 132 to transition to an active state. Specifically, storage management process 10 may write first joined indicator 170 to local memory 158 of active storage processor 100. Since (as discussed above) local memory 158 of active storage processor 100 is configured so that its contents are automatically copied/mirrored to peer memory 160 of passive storage processor 132, first joined indicator 170 may be automatically copied/mirrored to peer memory 160 of passive storage processor 132.

Upon receiving first joined indicator 170 from active storage processor 100, passive storage processor 132 may generate second joined indicator 172, which may indicate that passive storage processor 132 has transitioned to an active state. Specifically, passive storage processor 132 may write second joined indicator 172 to local memory 152 of passive storage processor 132. Since (as discussed above) local memory 152 of passive storage processor 132 is configured so that its contents are automatically copied/mirrored to peer memory 154 of active storage processor 100, second joined indicator 172 may be automatically copied/mirrored to peer memory 154 of active storage processor 100.

Storage management process 10 may receive 218 second joined indicator 172 on active storage processor 100 from passive storage processor 132, thus indicating the completion of the transition of passive storage processor 132 into an active state, thus allowing passive storage processor 10 to e.g., process various IO requests (e.g. IO request 20).

As discussed above, storage management process 10 may compare 208 first data array status indicator 162 to second data array status indicator 164 to determine if active storage processor 100 and passive storage processor 132 are seeing the same status for data array 130.

If active storage processor 100 and passive storage processor 132 are not seeing the same status for data array 130 (i.e., first data array status indicator 162 and second data array status indicator 164 do not match), storage management process 10 may normalize 220 the status of data array 130 so that active storage processor 100 and passive storage processor 132 see the same status for data array 130.

When normalizing 220 the status of data array 130, storage management process 10 may prevent 222 one of active storage processor 100 and passive storage processor 132 from seeing one or more drives (e.g., targets 102, 104, 106, 108, 110) included within data array 130. For example, assume that a link between passive storage processor 132 and target 104 has failed, but the link between active storage processor 100 and target 104 is operational. Accordingly, passive storage processor 132 would not see target 104, while active storage processor 100 would (resulting in first data array status indicator 162 and second data array status indicator 164 not matching). Therefore, storage management process 10 may prevent 222 active storage processor 100 from seeing target 104, resulting in both active storage processor 100 and passive storage processor 132 seeing the same status for data array 130, thus allowing for the transition of passive storage processor 132 into an active state (wherein both storage processors operate in a degraded mode; i.e., missing target 104).

Alternatively, when normalizing 220 the status of data array 130, storage management process 10 may redirect 224 IO commands between active and passive storage processors 102, 132. Continuing with the above-stated example in which the link between passive storage processor 132 and target 104 has failed, storage management process 10 may redirect 224 IO commands concerning target 104 that are received by passive storage processor 132 (which cannot access target 104) to active storage processor 100 (which can access target 104) so that active storage processor 100 may process IO commands concerning target 104.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, on an active storage processor from a passive storage processor, a join request indicator, wherein:
      the join request indicator indicates that the passive storage processor wants to transition to an active status, and
      the active storage processor and the passive storage processor are both coupled to a data array;
   providing, from the active storage processor to the passive storage processor, a status change indicator, wherein the status change indicator indicates that the passive-to-active transition of the passive storage processor has been initiated;
   receiving, on the active storage processor from the passive storage processor, a first data array status indicator, wherein the first data array status indicator indicates the status of the data array as seen by the passive storage processor, wherein the active storage processor receives the first data array status indicator by receiving a mirrored copy of the first data array status indicator generated by the passive storage processor after being locally stored at the passive storage processor;
   generating, on the active storage processor, a second data array status indicator, wherein the second data array status indicator indicates the status of the data array as seen by the active storage processor;
   comparing the first data array status indicator to the second data array status indicator to determine if the active storage processor and the passive storage processor are seeing the same status for the data array; and
   when the active storage processor and the passive storage processor are not seeing the same status for the data array, normalizing the status of the data array so that the active storage processor and the passive storage processor see the same status for the data array, wherein normalizing the status of the data array is accomplished by either normalizing the data array status of the active storage processor to the data array status of the passive storage processor or normalizing the data array status of the passive storage processor to the data array status of the active storage processor;
   when normalizing the data array status of the active storage processor to the data array status of the passive storage processor, preventing the active storage processor from seeing one or more drives included within the data array;
   when normalizing the data array status of the passive storage processor to the data array status of the active storage processor, preventing the passive storage processor from seeing one or more drives included within the data array.

2. The computer-implemented method of claim 1 further comprising:
   if the active storage processor and the passive storage processor are seeing the same status for the data array:
      providing, from the active storage processor to the passive storage processor, a first syncing indicator, wherein the first syncing indicator indicates that the active storage processor is ready to begin synchronization, and
      receiving, on the active storage processor from the passive storage processor, a second syncing indicator, wherein the second syncing indicator indicates that the passive storage processor is ready to begin synchronization.

3. The computer-implemented method of claim 2 further comprising:
   in response to receiving the second synching indicator:
      stopping all out-of-band activities being performed on the active storage processor,
      providing, from the active storage processor to the passive storage processor, a first joined indicator, wherein the first joined indicator indicates that the active storage processor is ready for the passive storage processor to transition to an active state, and
      receiving, on the active storage processor from the passive storage processor, a second joined indicator, wherein the second joined indicator indicates that the passive storage processor has transitioned to an active state.

4. The computer-implemented method of claim 1 wherein normalizing the status of the data array further includes:
   redirecting IO commands between the active and the passive storage processors.

5. A computer program product residing on a non-transitory computer readable medium having a plurality of instructions stored thereon which, when executed by a processor, cause the processor to perform operations comprising:
   receiving, on an active storage processor from a passive storage processor, a join request indicator, wherein:
      the join request indicator indicates that the passive storage processor wants to transition to an active status, and
      the active storage processor and the passive storage processor are both coupled to a data array;
   providing, from the active storage processor to the passive storage processor, a status change indicator, wherein the status change indicator indicates that the passive-to-active transition of the passive storage processor has been initiated;
   receiving, on the active storage processor from the passive storage processor, a first data array status indicator, wherein the first data array status indicator indicates the status of the data array as seen by the passive storage processor, wherein the active storage processor receives the first data array status indicator by receiving a mirrored copy of the first data array status indicator generated by the passive storage processor after being locally stored at the passive storage processor;
   generating, on the active storage processor, a second data array status indicator, wherein the second data array status indicator indicates the status of the data array as seen by the active storage processor;

comparing the first data array status indicator to the second data array status indicator to determine if the active storage processor and the passive storage processor are seeing the same status for the data array; and when the active storage processor and the passive storage processor are not seeing the same status for the data array, normalizing the status of the data array so that the active storage processor and the passive storage processor see the same status for the data array, wherein normalizing the status of the data array is accomplished by either normalizing the data array status of the active storage processor to the data array status of the passive storage processor or normalizing the data array status of the passive storage processor to the data array status of the active storage processor;

when normalizing the data array status of the active storage processor to the data array status of the passive storage processor, preventing the active storage processor from seeing one or more drives included within the data array;

when normalizing the data array status of the passive storage processor to the data array status of the active storage processor, preventing the passive storage processor from seeing one or more drives included within the data array.

6. The computer program product of claim 5 further comprising instructions for:

if the active storage processor and the passive storage processor are seeing the same status for the data array:

providing, from the active storage processor to the passive storage processor, a first syncing indicator, wherein the first syncing indicator indicates that the active storage processor is ready to begin synchronization, and receiving, on the active storage processor from the passive storage processor, a second syncing indicator, wherein the second syncing indicator indicates that the passive storage processor is ready to begin synchronization.

7. The computer program product of claim 6 further comprising instructions for:

in response to receiving the second synching indicator:

stopping all out-of-band activities being performed on the active storage processor, providing, from the active storage processor to the passive storage processor, a first joined indicator, wherein the first joined indicator indicates that the active storage processor is ready for the passive storage processor to transition to an active state, and receiving, on the active storage processor from the passive storage processor, a second joined indicator, wherein the second joined indicator indicates that the passive storage processor has transitioned to an active state.

8. The computer program product of claim 5 wherein normalizing the status of the data array further includes:

redirecting IO commands between the active and the passive storage processors.

9. A computing system including a processor and memory configured to perform operations comprising:

receiving, on an active storage processor from a passive storage processor, a join request indicator, wherein:

the join request indicator indicates that the passive storage processor wants to transition to an active status, and the active storage processor and the passive storage processor are both coupled to a data array;

providing, from the active storage processor to the passive storage processor, a status change indicator, wherein the status change indicator indicates that the passive-to-active transition of the passive storage processor has been initiated;

receiving, on the active storage processor from the passive storage processor, a first data array status indicator, wherein the first data array status indicator indicates the status of the data array as seen by the passive storage processor, wherein the active storage processor receives the first data array status indicator by receiving a mirrored copy of the first data array status indicator generated by the passive storage processor after being locally stored at the passive storage processor;

generating, on the active storage processor, a second data array status indicator, wherein the second data array status indicator indicates the status of the data array as seen by the active storage processor;

comparing the first data array status indicator to the second data array status indicator to determine if the active storage processor and the passive storage processor are seeing the same status for the data array; and when the active storage processor and the passive storage processor are not seeing the same status for the data array, normalizing the status of the data array so that the active storage processor and the passive storage processor see the same status for the data array, wherein normalizing the status of the data array is accomplished by either normalizing the data array status of the active storage processor to the data array status of the passive storage processor or normalizing the data array status of the passive storage processor to the data array status of the active storage processor;

when normalizing the data array status of the active storage processor to the data array status of the passive storage processor, preventing the active storage processor from seeing one or more drives included within the data array;

when normalizing the data array status of the passive storage processor to the data array status of the active storage processor, preventing the passive storage processor from seeing one or more drives included within the data array.

10. The computing system of claim 9 further configured to perform operations comprising:

if the active storage processor and the passive storage processor are seeing the same status for the data array:

providing, from the active storage processor to the passive storage processor, a first syncing indicator, wherein the first syncing indicator indicates that the active storage processor is ready to begin synchronization, and receiving, on the active storage processor from the passive storage processor, a second syncing indicator, wherein the second syncing indicator indicates that the passive storage processor is ready to begin synchronization.

11. The computing system of claim 10 further configured to perform operations comprising:

in response to receiving the second synching indicator:

stopping all out-of-band activities being performed on the active storage processor, providing, from the active storage processor to the passive storage processor, a first joined indicator, wherein the first joined indicator indicates that the active storage processor is ready for the passive storage processor to transition to an active state, and receiving, on the active storage processor from the passive storage processor, a second joined indicator, wherein the second joined indicator indicates that the passive storage processor has transitioned to an active state.

12. The computing system of claim 9 wherein normalizing the status of the data array further includes:

redirecting IO commands between the active and the passive storage processors.

* * * * *